Aug. 30, 1966   H. J. SHAFER   3,269,692
BALL VALVE CONSTRUCTION
Filed May 25, 1965   2 Sheets-Sheet 1

INVENTOR.
HOMER J. SHAFER
BY
Hamilton & Cook
ATTORNEYS

INVENTOR.
HOMER J. SHAFER
BY Hamilton & Cook
ATTORNEYS

United States Patent Office 3,269,692
Patented August 30, 1966

3,269,692
BALL VALVE CONSTRUCTION
Homer J. Shafer, 2300 Park Ave. W.
Mansfield, Ohio
Filed May 25, 1965, Ser. No. 458,600
6 Claims. (Cl. 251—172)

This application is a continuation-in-part of my copending application Serial No. 191,831, now Patent No. 3,195,857, filed May 2, 1962, entitled, Ball Valve Construction.

The invention relates to ball valves, and particularly to an improved construction of a fixed axis or trunnion-mounted ball shut-off valve. More particularly, the invention relates to an improved sealing construction for the ball shut-off.

Preferably, the improved sealing construction is embodied in a welded ball valve construction and insertable through the port openings of the flow tubes so that the seals can be installed and removed after the valve body is welded together.

It is an object of the present invention to provide a welded trunnion-mounted ball valve construction having a close working tolerance between the ball and the ball seating surfaces.

Another object is to provide a ball shut-off valve wherein the resilient seals for the ball are mounted on the ball and are insertable and removable through the flow ports, while being positioned out of the erosion or scouring area of the pressure fluid when the ball is throttling flow therethrough.

A further object is to provide an improved ball valve construction having adjustable ball seats.

Another object is to provide an improved ball valve construction having a free turning ball with positively effective upstream and downstream seals regardless of the direction of flow.

A still further object is to provide an improved sealing construction which will utilize cavity pressure to provide an effective seal on the downstream side of the ball, if the normal resilient seals both upstream and downstream are removed.

These and other objects are accomplished by the novel ball shut-off valve construction of the present invention, preferred embodiments of which are shown by way of example in the accompanying drawings and described in detail in the following specification as representing the best mode of achieving the purposes of the invention. Various changes and modifications are contemplated within the scope of the appended claims.

Referring to the drawings.

Figure 1:
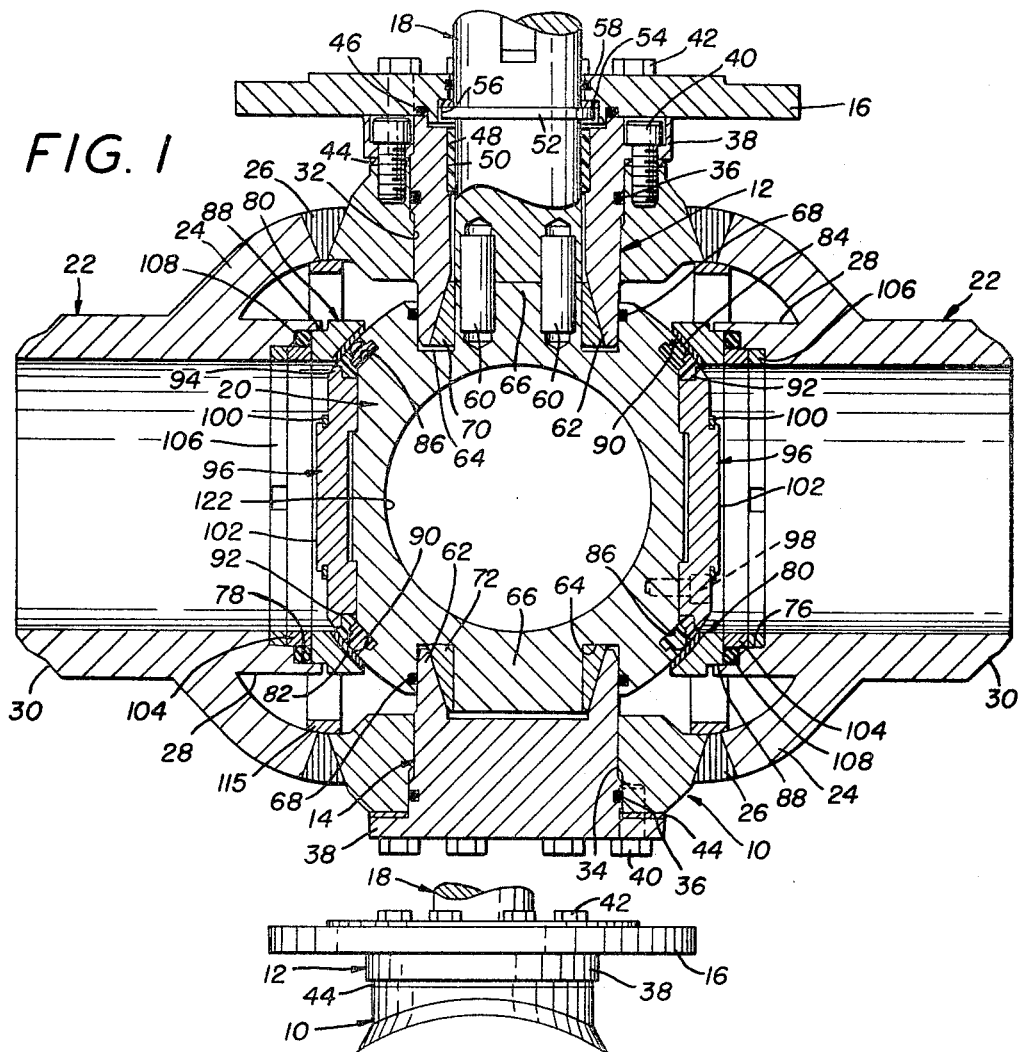
FIG. 1 is a longitudinal sectional view of a trunnion-mounted ball shut-off valve embodying one form of sealing construction, the ball being shown in fully closed position.
Figure 2:
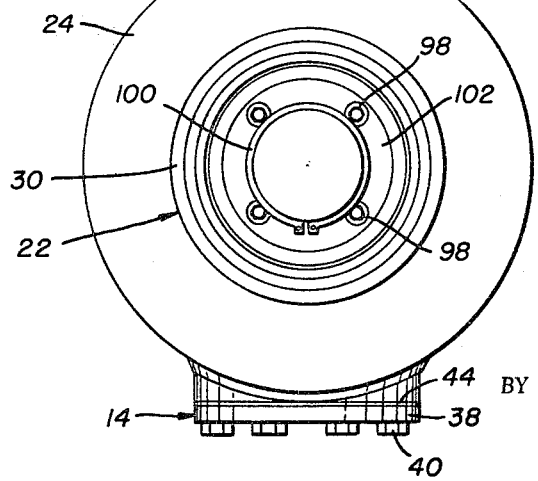
FIG. 2 is an end elevation of the ball shut-off of FIG. 1.

The valve body shown in FIGS. 1 and 2 preferably comprises a central tube 10 having transversely aligned top and bottom trunnions 12 and 14 therein, with an exterior annular mounting flange 16 carried on trunnion 12 for supporting a hydraulic motor (not shown) which rotates the valve stem 18 of the ball shut-off 20. The stem is journaled in the top tubular trunnion 12.

Flow tubes 22, having their axes coincident with the axis of central tube 10 are telescoped within the ends of tube 10 and have integral radially outwardly curved portions 24, the outer ends of which are welded to the ends of tube 10 at 26, and form a cavity around the ball 20.

The tubes 22 have inner cylindrical ends 28 within the ends of tube 10 and preferably are beveled at their outer ends 30 for welding connection to the pipes in the line in which the valve is connected.

The trunnions 12 and 14, as shown in FIG. 1, extend through aligned openings 32 and 34, respectively, in the central tube 10 and are provided with annular grooves for O-rings 36, the latter providing a seal between the trunnions and the openings in the tube 10. The top and bottom trunnions are further provided with annular flanges 38 which are preferably secured to the central tube 10 by bolts 40 and the exterior annular mounting flange 16 is secured to the top trunnion 12 by bolts 42. Shims 44 are interposed between the flanges of the trunnions and the central tube 10, and an O-ring 46 is disposed in an annular groove in the flange 16 to provide a seal between the flange and the top trunnion 12.

The valve stem 18 is journaled in the top trunnion 12 and a Teflon sleeve bushing 48 is provided therefor to fit within a counterbore 50 in the trunnion. An annular flange 52 on stem 18 abuts a Teflon stem thrust washer 54 on the underside of mounting flange 16, and both fit within a counterbore 56 provided in the mounting flange 16. O-ring 58 provides a further seal between the stem and flange 16. Preferably, the stem is keyed to the ball shut-off 20 by pins 60 so that there can be no relative movement between the ball and the stem.

The annular inner ends 62 of the top and bottom trunnions are preferably tapered or beveled, and fit within annular recesses 64 provided in the ball shut-off 20 about integrally formed stub shafts 66, the latter extending slightly above the spherical surface of the ball. Annular grooves are formed within the outer wall of the annular recesses for O-rings 68 which provide seals between the inner ends of the trunnions and the ball shut-off so as to prevent pressure in the cavity around the ball from getting within the annular recesses and forcing the trunnions outwardly. Within the annular recesses 64 are beveled bearing rings 70 and 72, complementary to the beveled inner ends 62 of the top and bottom trunnions and preventing bottoming of the trunnions in the ball to permit relatively free rotative support of the ball.

Due to the construction and arrangement of the upper tubular trunnion 12 journaling the valve stem 18 therein, the line pressures on the ball in closed position are taken by the upper and lower trunnions, with the result that the valve stem turns freely at all times.

The inner ends 28 of flow tubes 22 are each provided with stepped inner and outer counterbores 76 and 78 to axially adjustably accommodate separate ball seating rings 80, the latter preferably having spherical Stellite coated seating surfaces 82 to conform to the exterior surface of the ball 20.

The Stellite coated seating surfaces of the valve seating rings 80 abut the resilient flattened ribbed or T-shaped ring seals 84 disposed partially within grooves 86 provided in the outer surface of the ball. The axially outer ends of the seating rings have reduced shoulder portions 88 interfitting the inner ends 28 of flow tubes 22 within the outer counterbores 78.

The grooves 86 provided in the outer surface of the ball have flat surfaces which are substantially parallel with a tangent to the adjacent spherical seating surfaces 82, to provide back-up seats for the corresponding flat portions of the ring seals 84. The grooves 86 are provided with annular offset shoulders 90 for locking the corresponding shoulders of the radially outer peripheries of the ring seals in place; the opposite ring seal shoulders of the radial inner peripheries being locked in place by seal retainer rings 92. The seal retainer rings 92 are preferably formed of a relatively rigid yet flexible plastic such as Delrin and are in turn locked in place against the surface of the ball shut-off by the annular offset shoulders 94 of the retainer plates 96, which are secured to the ball by bolts 98. The bolts are locked in place by snap rings 100 fitting in annular grooves in the bosses 102 of the retainer plates.

Back-up rings 104 and split retainer rings 106 are respectively provided between the shoulder portions 88 of the seating rings 80 and the inner ends 28 of the flow tubes 22, each retainer ring 106 designed to interfit the inner counterbore 76 and each back-up ring 104 designed to axially extend inwardly past the inner counterbore 76 parallel to a portion of the outer counterbore 78 to hold an O-ring seal 108 in place. By using retainer rings of slightly varying sizes the tolerance between the ball and the seating rings can be adjusted. The ring seals 108 are radially outward of back-up rings 104 and serve as seals for the joints between the seating rings 80 and the inner ends 28 of the flow tubes 22.

The resilient flattened ribbed ring seals 84 and their grooves 86 in combination with the seal retainer rings 92, both in the ball shut-off 20, surround the inner ends of the valve seating rings 80 in the fully closed position of the ball. The ring seals are in longitudinally stretched condition and the cross section of the ring seals is such that the ring is mechanically deformed between the walls of the grooves and seal retainer rings and the Stellite coated seating surfaces to provide a tight seal between the ball and the seating rings.

The installation or replacement of the ring seals 84 in their respective grooves 86 wherein they are fully in face-to-face relation to the spherical seating surfaces in closed position and radially outwardly from the flow tube port openings is facilitated by the improved groove arrangement in cooperation with the particular configuration of the ring seals and ring seal retaining means. As described above, the flat bottomed grooves are substantially parallel with a tangent to the adjacent spherical seating surfaces 82. The radially outer peripheries of the grooves are defined by the annular offset shoulders 90, whereas the radially inner peripheries of the grooves are open. The flat bottom ring seals, which are approximately T-shape in cross section, readily slide in the grooves for secure locking abutment with the annular offset shoulders. The seal retainer rings 92, although formed from a semi-rigid type plastic such as Delrin, are nevertheless sufficiently deformable when inserted through the flow tube ports to snap into place and provide complementary locking shoulders in their radial outer peripheries for the opposite corresponding shoulders in the radially inner peripheries of the ring seals. The retainer plates 96, which have a diameter less than the diameter of the flow port openings, are freely insertable through the port openings and are provided with annular offset shoulders 94 locking the opposite corresponding shoulders of the radially inner peripheries of the retaining rings 92. The retaining plates are then bolted to the ball and the snap rings 100 prevent the bolts from becoming loose.

With the rings seals firmly locked in place, there is no danger of their being blown out of their grooves when the ring seals cross the flow tube openings during opening or closing of the ball shut-off. In the fully closed position only the ribbed portions of the ring seals project out from between the opposed locking shoulders of the ball and retainer rings, respectively, and sealingly contact the spherical seating surfaces.

On the downstream side of the ball, the cavity pressure within the valve in closed position acts to force the seating ring 80 against the ball and normally increase the effectiveness of the ring seal 84, and if the ring seals and seal retainer rings become ineffective, or are damaged by fire in and around the valve, the cavity pressure acts to maintain an effective seal with only slight seepage between the metal surface of the ball and the interfitting valve seating ring 80 on the downstream side of the ball.

Figure 1A:
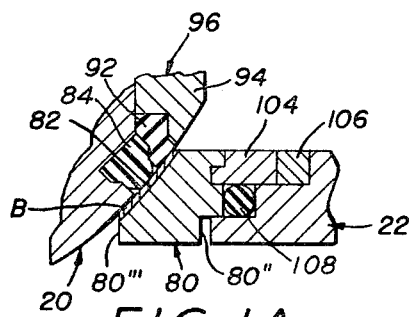
FIG. 1A is an enlarged fragmentary view of FIG. 1.
Figure 1B:
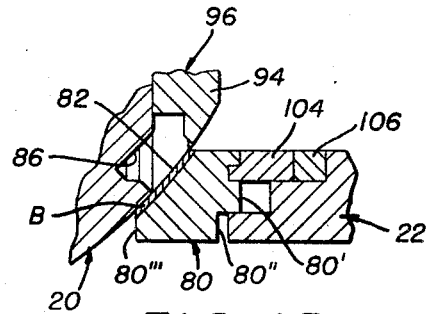
FIG. 1B is a view similar to FIG. 1A with the resilient sealing rings removed.

Assuming the flow through the valve to be from left to right as viewed in FIG. 1, and referring to FIG. 1B showing the resilient ring seals 84 and 108 and retainer ring 92 removed, the cavity pressure within the valve housing in the closed position of the ball acts on the seating ring 80 to force it against the ball in the area B between the edge of groove 86 and the outer edge of the seating surface 82 on the ring 80. This is because the surface area of ring 80 exposed to pressure forcing the ring toward the ball is substantially greater than the area exposed to pressure urging the ring away from the ball.

Thus, pressure acting against the surfaces 80' and 80" forces the ring 80 against the ball while the pressure against the lesser surface area 80''' urges the ring away from the ball, so that the differential pressure makes a seal against the ball in the area B. Even if this seal point is close to the edge of the groove 86, the surface 80' extends radially inward of that point to insure that the pressure area forcing the seal against the ball is always greater than that urging it away from the ball.

Accordingly, if the resilient seals in the construction of FIG. 1 are damaged or destroyed the downstream seal between the ball and the seating ring on the downstream side is substantially effective except for slight seepage until the pressure is shut off elsewhere in the line and the resilient seals replaced.

Figure 3A:
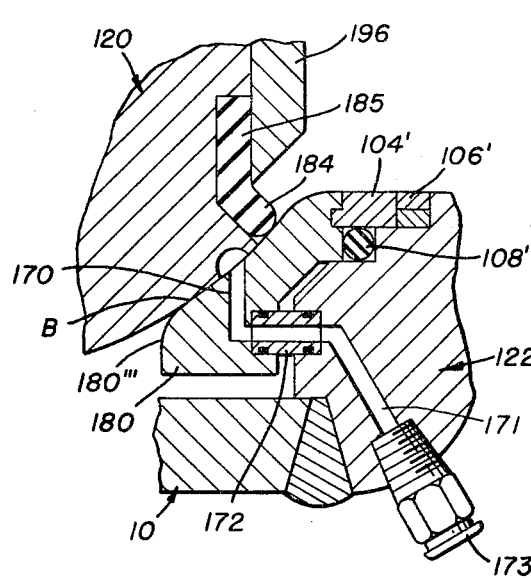
FIG. 3A is a fragmentary sectional view of a modified sealing construction.
Figure 3B:
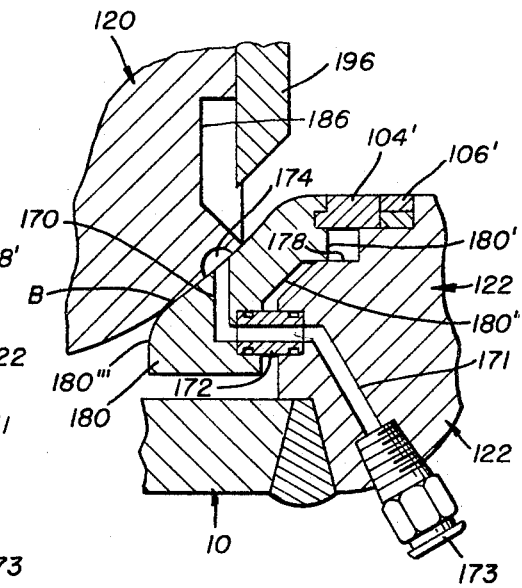
FIG. 3B is a view similar to FIG. 3A with the resilient sealing rings removed.

In the modified sealing construction shown in FIGS. 3A and 3B, the ball 120 is provided with a radially elongated groove 186 for receiving a resilient ring seal 184 having a stem 185 which is overlapped by a retaining ring 196 having an outer diameter smaller than the inner diameter of flow tube 122. The seating ring 180 is held in place by a back-up ring 104' and a split retainer ring 106', and an O-ring seal 108' is normally inserted between the outer diameter of back-up ring 104' and an annular shoulder 178 in the flow tube. The seating ring 180 has an annular rib or shoulder 180' normally abutting O-ring 108'.

Referring to FIG. 3B, showing the rings 185 and 108' removed, the cavity pressure acts on the downstream seating ring 180 to force it against the ball in the area B somewhere between the radially outer edge of groove 186 and the outer edge of the seating surface of ring 180, because the pressure-exposed surface areas 180' and 180" are greater than the surface area 180'''.

As shown, a supplemental lubricant seal may be provided in the area B between the ball and seating ring to increase the effectiveness of the seal between the ball and the seating ring when seal ring 184 is damaged or removed. In such case, lubricant passageways 170 and 171 are provided in the seating ring and flow tube, respectively, connected by a sealing gland 172, with an exterior supply fitting 173 at the outer end of passageway 171. The inner end of passageway 170 communicates with a lubricant groove 174 in the surface of the ball in the surface area B. Thus, if the seal 184 becomes destroyed or damaged, lubricant can be injected into the groove 174 to reduce or substantially eliminate the seepage between the ball and seating ring until the seal 184 is replaced.

What is claimed is:

1. In a trunnion-mounted ball valve having a housing forming a cavity laterally around the ball and flow tubes longitudinally of the valve, seating rings adjustable longitudinally between the ball and the flow tubes, and resilient seals between the seating rings and the ball, the improvement comprising means for utilizing the cavity pressure to force the seating ring on the downstream side of the ball to seal against the ball radially outwardly of the resilient seal, said means comprising a seating ring construction having a greater area exposed to cavity pressure acting toward the ball than its area exposed to cavity pressure acting away from the ball.

2. In a trunnion-mounted ball valve having a housing forming a cavity laterally around the ball and flow tubes longitudinally of the valve, seating rings adjustable longitudinally between the ball and the flow tubes, and resilient seals between the seating rings and the ball, the improvement comprising means for utilizing the cavity pressure to force the seating ring on the downstream side of the ball to seal against the ball radially outwardly of the resilient seal, said means comprising a seating ring having an effective transversely extending area exposed to cavity pressure directed toward the ball greater than its effective transverse area exposed to cavity pressure acting away from the ball.

3. In a trunnion-mounted ball valve having a housing forming a cavity laterally around the ball and flow tubes leading to and from the ball, seating rings longitudinally adjustably mounted between the ball and the flow tubes, and resilient seals between the seating rings and the ball, seal seating rings being so constructed and arranged as to present a greater area exposed to cavity pressure acting toward the ball than the area exposed to cavity pressure acting away from the ball, whereby to force the seating ring on the downstream side of the ball in closed position into sealing contact with the ball radially outwardly of the resilient seal.

4. In a truunion-mounted ball valve having a housing forming a cavity laterally around the ball and flow tubes leading to and from the ball, seating rings longitudinally adjustably mounted between the ball and the flow tubes, and resilient seals between the seating rings and the ball, and seating rings having a greater effective transverse area opposite to the ball than the effective area contiguous to the ball, whereby the cavity pressure on the downstream side of the ball in closed position will force the downstream seating ring into sealing contact with the ball radially outwardly of the resilient seal.

5. In a trunnion-mounted ball valve having a housing forming a cavity laterally around the ball and flow tubes leading to and from the ball, seating rings adjustably mounted between the ball and the flow tubes, ring grooves in the ball opposing the seating rings and with their inner peripheries opening into the flow tubes in the fully closed position of the ball, and resilient ring seals insertable through the flow tubes into said grooves for making sealing contact with the seating rings in the fully closed position of the ball, the improvement comprising constructing the seating rings to present a greater area exposed to cavity pressure acting toward the ball than the area thereof acting away from the ball, with respect to a sealing contact between that part of the ball and seating ring radially outward of the normal contact between the ring seal and seating ring.

6. In a trunnion-mounted ball valve having a housing forming a cavity laterally around the ball and flow tubes leading to and from the ball, seating rings adjustably mounted between the ball and the flow tubes, ring grooves in the ball opposing the seating rings and with their inner peripheries opening into the flow tubes in the fully closed position of the ball, and resilient ring seals insertable through the flow tubes into said grooves for making sealing contact with the seating rings in the fully closed position of the ball, the improvement comprising constructing the downstream seating ring to have an effective transverse area exposed to cavity pressure directed toward the ball greater than its effective transverse area exposed to cavity pressure acting away from the ball, with respect to a sealing contact between that part of the ball and seating ring radially outward of the normal contact between the ring seal and seating ring.

References Cited by the Examiner

UNITED STATES PATENTS 2,653,004    2/1947    Schnyder _____ 251—309
3,132,837    9/1960    Britton _____ 251—172

FOREIGN PATENTS 899,489    6/1940    France.

M. CARY NELSON, *Primary Examiner.*

E. K. FEIN, *Assistant Examiner.*

UNITED STATES PATENT OFFICE
CERTIFICATE OF CORRECTION

Patent No. 3,269,692　　　　　　　　　　　　　　　August 30, 1966

Homer J. Shafer

It is hereby certified that error appears in the above numbered patent requiring correction and that the said Letters Patent should read as corrected below.

Column 5, line 19, for "seal" read -- said --; line 31, for "and" read -- said --; column 6, line 36, for "899,489" read -- 859,489 --.

Signed and sealed this 26th day of September 1967.

(SEAL)
Attest:

ERNEST W. SWIDER
Attesting Officer

EDWARD J. BRENNER
Commissioner of Patents